Patented Jan. 26, 1954

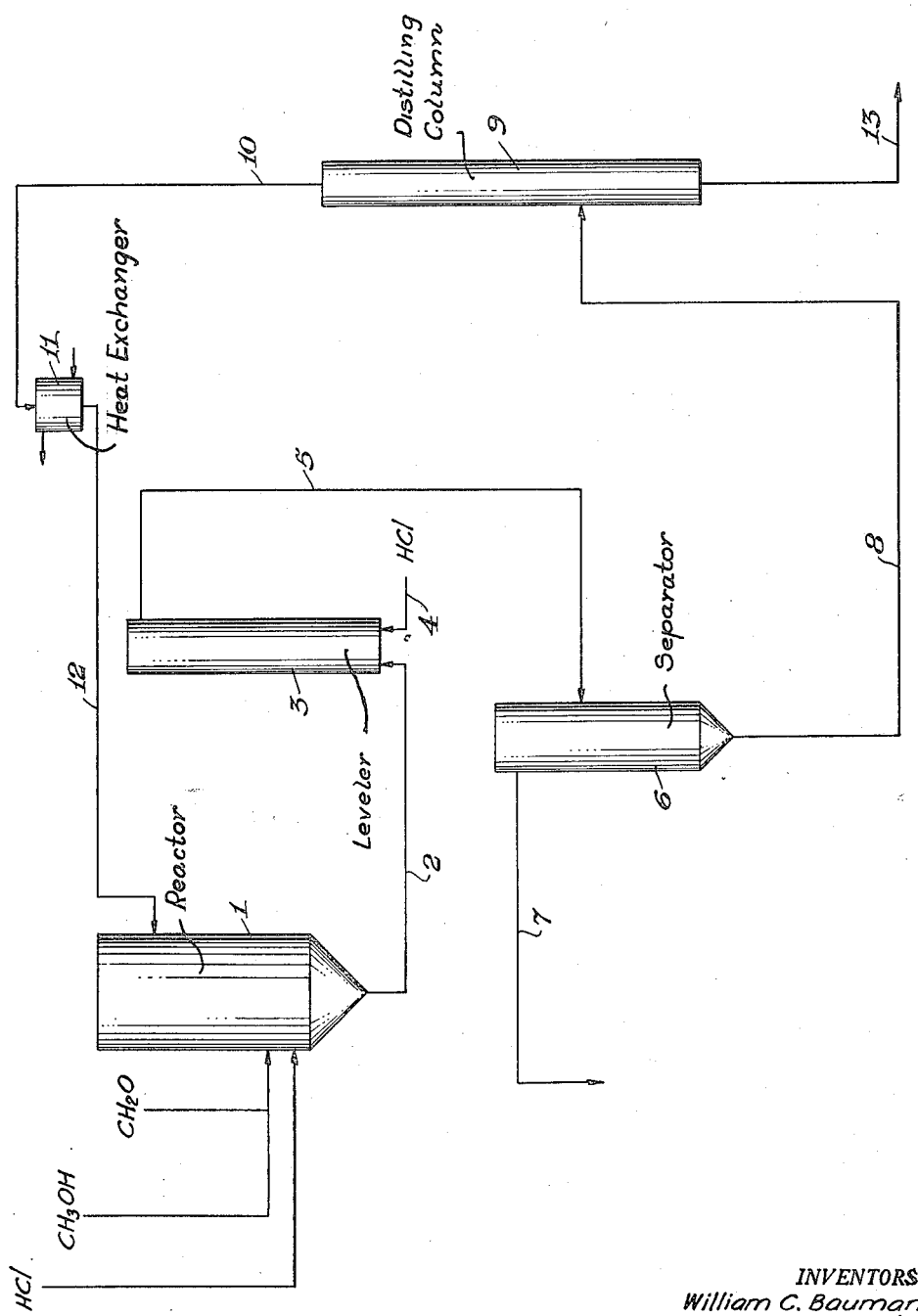

2,667,516

UNITED STATES PATENT OFFICE 2,667,516

PROCESS FOR MAKING CHLOROMETHYL METHYL ETHER

William C. Bauman and Elmer L. McMaster, Midland, Mich., assignors to The Dow Chemical Company, Midland, Mich., a corporation of Delaware Application June 7, 1950, Serial No. 166,757

3 Claims. (Cl. 260—614)

This invention concerns an improved process for making chloromethyl methyl ether. It relates more particularly to the production of chloromethyl methyl ether in continuous manner by reaction of hydrogen chloride with a mixture of formaldehyde and methyl alcohol.

It is known to prepare chloromethyl methyl ether by passing hydrogen chloride into a mixture consisting of methyl alcohol and an aqueous solution of formaldehyde until the mixture is saturated with hydrogen chloride and thereafter separating the aqueous and the organic layers of the reaction mixture.

The method heretofore proposed for the production of chloromethyl methyl ether has the disadvantage that the yield of chloromethyl methyl ether is lower than is desired, particularly for production of the compound in large quantities such as are required on a commercial scale. A considerable amount, e. g. 20 per cent by weight or more, of the chloromethyl methyl ether product remains dissolved in the aqueous phase of the reaction mixture and cannot readily be recovered in usual manner, such as by salting out, or by distillation. When attempt is made to recover chloromethyl methyl ether from the aqueous phase of the reaction mixture by distillation, a large part of the chloromethyl methyl ether decomposes in the presence of the water vapor to form hydrogen chloride, formaldehyde and methyl alcohol. These compounds, particularly the formaldehyde and the methyl alcohol frequently react together to form by-product substances, e. g. methylal, so that the overall yield of chloromethyl methyl ether is undesirably low.

It is an object of the invention to provide a process for making chloromethyl methyl ether in an aqueous medium which avoids loss of the chloromethyl methyl ether product in the aqueous phase of the reaction mixture. Another object is to produce chloromethyl methyl ether in good yield by reaction of methyl alcohol, hydrogen chloride and formaldehyde in an aqueous medium. Still another object is to provide a process for making chloromethyl methyl ether of high purity by procedure which prevents, or substantially reduces the tendency toward, the formation of undesirable by-products. A further object is to provide a process for making chloromethyl methyl ether in continuous manner by reaction of hydrogen chloride, methyl alcohol and formaldehyde in aqueous medium. Other and related objects will become apparent from the following description of the invention.

According to the invention, chloromethyl methyl ether can readily be prepared in good yield by introducing hydrogen chloride into a mixture containing as the essential reactants methyl alcohol and formaldehyde, the latter being preferably in the form of an aqueous solution, maintaining the mixture at reaction temperatures of 60° C. or lower, until it is substantially saturated wth hydrogen chloride, withdrawing the resulting mixture from the reaction zone, separating the aqueous and the organic layers of the reaction mixture, distilling the aqueous layer to remove vapors of the volatile components together with a portion of the water and leave a residue consisting principally of an aqueous solution of hydrogen chloride and feeding the vapors, or distillate, and a further quantity of the hydrogen chloride, methyl alcohol and formaldehyde reactants to the reaction zone.

By removing vapors of the volatile ingredients together with water from the aqueous layer and recycling the vapors as such, or in condensed or liquid form, into admixture with additional amounts of the hydrogen chloride, methyl alcohol and formaldehyde reactants, in continuous manner as just described, it has been found that the reaction approaches a condition of equilibrium at which the yield of the chloromethyl methyl ether obtained in the process is nearly quantitative, based on the methyl alcohol and the formaldehyde reactants.

The chloromethyl methyl ether product, which is separated as the organic layer of the reaction mixture, is usually substantially pure, i. e. of 95 per cent purity or higher. Such product is suitable for many purposes without need of further purification, e. g. the chloromethylation of aromatic compounds such as benzene or toluene. If desired, the chloromethyl methyl ether may be further purified in usual ways, e. g. by distillation.

The accompanying schematic drawing in the form of a flow diagram illustrates a way in which the process of the invention may be employed.

In the drawing, the methyl alcohol and the formaldehyde, preferably in the form of an aqueous solution, and the hydrogen chloride are fed into admixture with each other in a reactor 1, wherein the mixture is agitated and is substantially saturated with the hydrogen chloride while cooling the mixture to remove the exothermic heat of reaction. The reaction mixture is withdrawn through conduit 2 and flows into a lower section of a leveling tower 3. Hydrogen chloride is also introduced into a lower section of the leveling tower 3 through inlet 4. The reaction mixture flows from an outlet in an upper section of the leveling tower 3, via conduit 5, into separator 6, where the mixture separates into an organic layer and an aqueous layer. The upper or organic layer, consisting of chloromethyl methyl ether of good purity, is withdrawn from the separator through conduit 7. The aqueous layer is withdrawn from the separator via conduit 8 and is fed into the mid-section of distilling column 9, wherein vapors of the volatile components, together with a portion of the water are removed from the remaining liquid. The distillate or vapors are passed via conduit 10 through a cooling device 11 and are fed via conduit 12 into the reactor 1. The residue from the distilling column 9 is withdrawn through conduit 13.

In carrying out the reaction, the liquid mixture, withdrawn from the reaction zone, is passed or fed into a separator or decanter where it quickly separates into an upper organic layer and a lower aqueous layer. The organic layer is withdrawn as a liquid having a specific gravity of from 1.060 to 1.080 at 25° C. and consists principally of chloromethyl methyl ether having hydrogen chloride dissolved therein. When the organic layer is obtained as a liquid of lower density than that just stated, such as may occur when putting the process into operation, the organic liquid together with the volatile components of the aqueous layer are recycled to the reaction zone and treated with hydrogen chloride until the organic layer which separates from the reaction mixture has a specific gravity within the range just mentioned. Thereafter, operation of the process consists of introducing the reactants into admixture with each other in the reaction zone, separating the aqueous and the organic layers of the reaction mixture, distilling the aqueous layer to remove vapors of the volatile components together with a portion of the water from the aqueous liquid and feeding the distillate into the reaction zone, all in continuous manner.

The hydrogen chloride is employed in amount sufficient to saturate the mixture. It reacts with the formaldehyde and the methyl alcohol to form chloromethyl methyl ether. The hydrogen chloride is usually added to the mixture until the mixture is saturated or substantially saturated with respect to the hydrogen chloride. The hydrogen chloride is advantageously added to the mixture of the formaldehyde and the methyl alcohol as rapidly as the exothermic heat of reaction can be removed in any usual manner, e. g. by external cooling. For a given reactor, it has been observed that the chloromethyl methyl ether product is obtained in better yield and of higher purity when the hydrogen chloride is rapidly introduced into a mixture of the formaldehyde and the methyl alcohol until the mixture is saturated with respect thereto, than when the hydrogen chloride is added more slowly over a longer period of time.

The formaldehyde is preferably employed in the form of an aqueous solution containing from 27 to 40 per cent by weight or more of the formaldehyde, although formaldehyde in solid form, such as paraformaldehyde, metaformaldehyde, trioxymethylene, polyoxymethylene or alpha-trioxymethylene may also be used.

The formaldehyde and the methyl alcohol are usually employed in stoichiometric, or substantially stoichiometric, proportions, i. e. in amounts corresponding to approximately molecular equivalent proportions of the methyl alcohol and the formaldehyde.

The reaction which occurs readily at temperatures of from 0° to 60° C. is preferably carried out at temperatures of from 10° to 50° C. and at atmospheric or substantially atmospheric pressure, although somewhat higher pressures such as a pressure of from 5 to 20 pounds per square inch, gauge, may be used.

In practice, the methyl alcohol and the formaldehyde, preferably in the form of an aqueous solution, are fed continuously, or intermittently, in the desired proportions into a reaction zone. Hydrogen chloride is also fed to said zone in amount sufficient to saturate the reaction mixture. The latter is maintained at a reaction temperature within the range just mentioned. The reaction mixture flows from the reaction zone to a separator or decanter where the aqueous and the organic layers of the reaction mixture are separated. The chloromethyl methyl ether, which is obtained as the organic layer, is usually of 95 per cent purity or higher. If desired, it may be further purified in usual ways, e. g. by distillation. The aqueous layer is passed in continuous manner from the separator to a distilling column, or dephlegmator, where a mixture of chloromethyl methyl ether, a portion of the water and lower boiling components are removed as vapors and are returned to the reaction zone. The residue consisting principally of an aqueous solution of hydrogen chloride, or hydrochloric acid, is withdrawn from a lower portion of the distilling column.

The following examples illustrate ways in which the principle of the invention has been applied, but are not to be construed as limiting the invention.

*Example 1*

A solution consisting of 160 grams (5 moles) of methyl alcohol and 416 grams of an aqueous solution containing 36 per cent by weight of formaldehyde, was placed in a glass reaction flask equipped with a gas inlet, a reflux condenser and a stirrer. The solution was stirred and a stream of hydrogen chloride added thereto over a period of about 30 minutes, while maintaining the mixture at a temperature of 20° C. Sufficient hydrogen chloride was added to the mixture to saturate the solution and form chloromethyl methyl ether. The aqueous and the organic layers of the reaction mixture were separated. There was obtained 173 grams of organic liquid having a specific gravity of 1.073 at 25° C. It was substantially pure chloromethyl methyl ether. Volatile ingredients and a portion of the water were distilled from the aqueous layer at atmospheric pressure and at distilling temperatures up to 85° C. The residue was discarded. The distillate vapors were absorbed or condensed in a solution consisting of 160 grams (5 moles) of methyl alcohol and 416 grams of an aqueous 36 weight per cent solution of formaldehyde. This mixture was saturated with hydrogen chloride by procedure as just described, and the aqueous and the organic layers of the reaction mixture thereafter separated. There was obtained 332 grams of chloromethyl methyl ether as the organic layer having a specific gravity of 1.072 at 25° C. The aqueous layer was distilled as described above and the vapors absorbed in a solution consisting of 160 grams of methyl alcohol and 416 grams of an aqueous 36 weight per cent solution of formaldehyde. This mixture was maintained at a temperature of 20° C. and was saturated with hydrogen chloride.

The aqueous and the organic layers of the reaction mixture were then separated. The yield of chloromethyl methyl ether was substantially quantitative, based on the methyl alcohol and the formaldehyde starting materials.

Example 2

A mixture consisting of molecular equivalent proportions of methyl alcohol and formaldehyde, the latter being in the form of an aqueous solution containing 37 per cent by weight of the formaldehyde, was fed in continuous manner at a rate corresponding to 11.3 pounds of the mixture per hour, into a reaction zone where it was rapidly mixed with a stream of hydrogen chloride corresponding to a flow of 6.23 pounds of the hydrogen chloride per hour while the mixture was maintained at a reaction temperature between 34° and 37° C. over a reaction time of about 3 hours. By reaction time is meant the time for an infinitesimal portion of the reaction mixture to traverse the reaction zone. The reaction mixture was passed from the reaction zone to a separator where the aqueous and the organic layers of the mixture were separated from each other. The aqueous layer was fed into a distilling column where it was heated to temperatures between 94° and 99° C. to remove vapors of volatile components, together with a portion of the water from the remaining liquid. The vapors, or distillate, was passed through a cooling device and was fed into the reaction zone. Residue liquid, consisting principally of an aqueous solution containing about 20 per cent by weight of hydrochloric acid, was continuously withdrawn from the bottom of the distilling column. The organic layer of the reaction mixture was continuously withdrawn from the separator. The process was operated in continuous manner until the system was in balance, i. e. until the combined weight of the chloromethyl methyl ether product and the aqueous residue, withdrawn from the system in pounds per hour, corresponded to the combined weight of the hydrogen chloride, the methyl alcohol and the formaldehyde solution, fed into the system in pounds per hour. Thereafter, over a period of 6.35 hours, there was fed into the system 20.5 pounds (0.64 mole) of methyl alcohol, 51.5 pounds of aqueous 37 weight per cent formaldehyde solution and 39.6 pounds of hydrogen chloride. There was obtained 46.5 pounds of organic liquid having a specific gravity of 1.070 at 25° C. It was substantially pure chloromethyl methyl ether. The yield was 91 per cent of theory.

Other modes of applying the principle of the invention may be employed instead of those explained, change being made as regards the step or steps herein employed, provided the step or steps stated in any of the following claims or the equivalent of such step or steps be employed.

We claim:

1. In a method of making chloromethyl methyl ether wherein a solution containing approximately equimolecular proportions of formaldehyde and methyl alcohol is substantially saturated with hydrogen chloride at temperatures between 0° and 60° C. and the chloromethyl methyl ether product is separated as a liquid organic layer from the liquid aqueous phase of the reaction mixture, the improvement which consists in heating the liquid aqueous phase of the reaction mixture to distill volatile components, together with a portion of the water and leave an aqueous residue containing approximately 20 percent by weight of hydrochloric acid, mixing the distillate with a further quantity of the above-mentioned starting materials in the proportions given, and repeating the process as just described.

2. In a method of making chloromethyl methyl ether wherein a mixture of an aqueous solution containing at least 27 per cent by weight of formaldehyde and an equimolecular proportion of methyl alcohol is saturated with hydrogen chloride at temperatures between 0° and 60° C. and the chloromethyl methyl ether product is separated as a liquid organic layer from the liquid aqueous phase of the reaction mixture, the improvement which consists in heating the liquid aqueous phase of the reaction mixture to distill volatile components, together with a portion of the water and leave an aqueous residue containing approximately 20 percent by weight of hydrochloric acid, mixing the distillate with a further quantity of the above-mentioned starting materials in the proportions given and repeating the process as just described.

3. In a continuous method of making chloromethyl methyl ether wherein a mixture of an aqueous solution containing from 27 to 40 per cent by weight of formaldehyde and an equimolecular proportion of methyl alcohol is fed to a reaction zone, together with hydrogen chloride in amount sufficient to saturate the mixture therewith at temperatures between 0° and 60° C. and the chloromethyl methyl ether product is separated as a liquid organic layer from the liquid aqueous phase of the reaction mixture, the improvement which consists in continuously feeding the liquid aqueous phase of the reaction mixture into a zone where it is heated to distill volatile components, together with a portion of the water and leave an aqueous residue containing approximately 20 percent by weight of hydrochloric acid, continuously introducing the distillate into the reaction zone while feeding the aqueous solution of formaldehyde and methyl alcohol together with hydrogen chloride to said reaction zone in the proportions given and continuing the process as just described.

WILLIAM C. BAUMAN.
ELMER L. McMASTER.

References Cited in the file of this patent

UNITED STATES PATENTS

| Number | Name | Date |
| --- | --- | --- |
| 2,304,431 | Walker | Dec. 8, 1942 |
| 2,370,540 | Hodge | Feb. 27, 1945 |
| 2,532,044 | Walker et al. | Nov. 28, 1950 |

OTHER REFERENCES

Walker, "Formaldehyde," Reinhold Publishing Corp., New York (1944), pages 138-9.

Lange, Handbook of Chemistry, sixth edition, Sept. 1946, pages 404-5, Handbook Publishers, Inc., Sandusky, Ohio.